US008452706B1

(12) United States Patent
Moadus et al.

(10) Patent No.: US 8,452,706 B1
(45) Date of Patent: May 28, 2013

(54) METHODS AND APPARATUSES FOR PRESENTING OFFERS FOR FINANCIAL PRODUCTS

(75) Inventors: Elliott Moadus, Concord, NC (US); Marina Moore, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 235 days.

(21) Appl. No.: 12/430,729

(22) Filed: Apr. 27, 2009

(51) Int. Cl.
*G06Q 40/00* (2006.01)

(52) U.S. Cl.
USPC .......................................................... 705/40

(58) Field of Classification Search
CPC ..................................................... G06F 17/60
USPC .......................................................... 705/40
See application file for complete search history.

(56) References Cited

U.S. PATENT DOCUMENTS

| | | | | |
|---|---|---|---|---|
| 5,913,202 | A * | 6/1999 | Motoyama | 705/36 R |
| 6,354,490 | B1 * | 3/2002 | Weiss et al. | 235/379 |
| 6,745,188 | B2 * | 6/2004 | Bradburn | 705/35 |
| 7,278,114 | B2 * | 10/2007 | Lapidous | 715/808 |
| 7,472,088 | B2 * | 12/2008 | Taylor et al. | 705/38 |
| 7,533,803 | B2 * | 5/2009 | Long, Sr. | 235/379 |
| 7,748,614 | B2 * | 7/2010 | Brown | 235/379 |
| 2002/0194094 | A1 * | 12/2002 | Lancaster et al. | 705/35 |
| 2002/0198807 | A1 * | 12/2002 | Kobayashi et al. | 705/35 |
| 2003/0055783 | A1 * | 3/2003 | Cataline et al. | 705/40 |
| 2003/0083970 | A1 * | 5/2003 | Bigman et al. | 705/35 |
| 2007/0262140 | A1 * | 11/2007 | Long | 235/380 |
| 2008/0046349 | A1 * | 2/2008 | Elberg et al. | 705/35 |
| 2008/0091530 | A1 * | 4/2008 | Egnatios et al. | 705/14 |
| 2008/0109378 | A1 * | 5/2008 | Papadimitriou | 705/36 R |
| 2008/0169344 | A1 * | 7/2008 | Huh | 235/380 |
| 2008/0215377 | A1 * | 9/2008 | Wottowa et al. | 705/4 |
| 2010/0070430 | A1 * | 3/2010 | Favvas | 705/36 R |
| 2010/0088220 | A1 * | 4/2010 | Langley | 705/38 |
| 2010/0106577 | A1 * | 4/2010 | Grimes | 705/14.15 |

FOREIGN PATENT DOCUMENTS

EP 2 246 815 * 4/2009

OTHER PUBLICATIONS

Bishton, Tamsin: Online Banking: One hit wonder—Account aggrgation allows user to access all their financial products via a single website, Nov. 21, 2001, Brandrepublic, revolutionmagazine.com, pp. 1-15.*
Shah, B: How to access multiple bank and credit accounts by single login, Mar. 2008, Internet Archives, www.ehow.com, pp. 1-4.*
Mint.com, Find Ways to Save, www.mint.com/features/save/ (last visited Feb. 4, 2009).

* cited by examiner

*Primary Examiner* — Bijendra K Shrestha
(74) *Attorney, Agent, or Firm* — Michael A. Springs; Moore & Van Allen PLLC; Padowithz Alce

(57) ABSTRACT

Embodiments of the present invention relate to apparatuses and methods for presenting offers for financial products, and more particularly, for presenting offers for financial products in graphical user interfaces. For example, in one embodiment, a method is provided for: (1) providing a graphical user interface to the display device of a computerized apparatus, wherein the graphical user interface comprises information associated with a financial account; (2) determining an offer for a financial product based at least partially on a comparison of the financial account to the financial product; and (3) presenting the offer for the financial product in the graphical user interface.

27 Claims, 3 Drawing Sheets

METHODS AND APPARATUSES FOR PRESENTING OFFERS FOR FINANCIAL PRODUCTS

FIELD

In general, embodiments of the present invention relate to methods and apparatuses for presenting offers for financial products, and more particularly, for presenting offers for financial products in graphical user interfaces.

BACKGROUND

It is well-known that a typical consumer uses several financial accounts that are not all maintained by the same financial institution. This is often the case even though any of the financial institutions with which the consumer does business is capable of providing the same or similar financial services as its competitors. For example, a consumer may have a checking account maintained by Bank A, a credit card account maintained by Retail Store B, and a savings account maintained by Credit Union C, even though, for example, Bank A offers credit card accounts similar to those offered by Retail Store B and savings accounts similar to those offered by Credit Union C. Financial institutions have long been aware of this type of consumer behavior, but they have had trouble persuading their customers to behave differently, namely, to use only their financial accounts. For example, it is usually difficult for financial institutions to determine which of their customers are using financial accounts maintained by other financial institutions, the identity of those other financial institutions, and/or the details of the financial accounts maintained by those other financial institutions. Even when this information is known, financial institutions have difficulty persuading their customers to stop using financial accounts maintained by their competitors and start using financial accounts maintained by them. Accordingly, banks and other financial institutions have a long-felt but unmet need for an apparatus and/or method for persuading their customers to use financial accounts and/or other financial products offered by them instead of using financial products offered by their competitors.

SUMMARY OF SELECTED EMBODIMENTS OF THE INVENTION

Embodiments of the present invention relate to apparatuses and methods for presenting offers for financial products. For example, in one embodiment, a method is provided for presenting offers for financial products. In one embodiment, the method comprises: (1) providing a graphical user interface to the display device of a computerized apparatus, wherein the graphical user interface comprises information associated with a financial account; (2) determining an offer for a financial product based at least partially on a comparison of the financial account to the financial product; and (3) presenting the offer for the financial product in the graphical user interface.

In one embodiment of the method, the presenting the offer for the financial product in the graphical user interface further comprises presenting the offer proximate to the information associated with the financial account. In another embodiment, the graphical user interface comprises a graphical user interface for an online banking system. In still another embodiment, the offer comprises information associated with the financial product.

In one embodiment of the method, the offer comprises a comparison of one or more features of the financial product to one or more features of the financial account. In another embodiment, the offer comprises information associated with a benefit provided by the financial product that is not provided by the financial account. In another embodiment of the method, the presenting the offer for the financial product in the graphical user interface further comprises presenting a selectable path in the graphical user interface that at least partially relates to the offer.

In one embodiment of the method, the presenting the offer for the financial product in the graphical user interface further comprises presenting a pop-up in the graphical user interface that at least partially relates to the offer. In another embodiment, the offer is configured to be accepted in the graphical user interface. In still another embodiment, both the financial account and the financial product are at least one of a checking account, debit card account, credit card account, savings account, certificate of deposit account, investment account, loan account, and credit line account.

In one embodiment, the financial product is a bank financial product and the financial account is maintained by a party other than the bank. In another embodiment of the method, the presenting the offer for the financial product in the graphical user interface further comprises presenting the offer in a centralized location in the graphical user interface. In still another embodiment, the presenting the offer for the financial product in the graphical user interface further comprises modifying the appearance of the information associated with the financial account in the graphical user interface to indicate that the offer for a financial product has been presented. In another embodiment, the determining an offer for a financial product further comprises determining a benefit provided by the financial product that is not provided by the financial account.

As another example, in another embodiment of the present invention, an apparatus for providing a graphical user interface is provided. In one embodiment, the apparatus comprises a communication interface, computer-executable program code portions stored in a computer-readable storage medium, and a processor configured to execute the computer-executable program code portions and use the communication interface to provide the graphical user interface to the display device of a computerized apparatus. In one embodiment, the graphical user interface comprises information associated with a first financial account. In another embodiment, the graphical user interface further comprises an offer for a second financial account displayed proximate to the information associated with the first financial account, wherein the second financial account is at least partially similar to the first financial account.

In one embodiment of the apparatus, both the first financial account and the second financial account are one of a checking account, debit card account, credit card account, savings account, certificate of deposit account, investment account, loan account, and credit line account. In another embodiment, the offer comprises information associated with the second financial account. In yet another embodiment, the offer comprises a comparison of one or more features of the second financial account to one or more features of the first financial account.

In one embodiment of the apparatus, the offer comprises information associated with a benefit provided by the second financial account that is not provided by the first financial account. In another embodiment, the offer comprises a selectable path configured to accept the offer for the second financial account. In yet another embodiment, the second financial account is maintained by a bank and the first financial account is maintained by a party other than the bank. In still another embodiment, the graphical user interface comprises a graphical user interface for an online banking system.

As another example, in one embodiment, an apparatus for determining an offer for a financial product is provided. In one embodiment, the apparatus comprises: (1) a communication device configured to receive information associated with a financial account; (2) a memory device configured to store information associated with one or more financial products; and (3) a processor operatively connected to the communication device and the memory device, the processor being configured to determine an offer for a financial product based at least partially on a comparison of the information associated with the financial account to information associated with the financial product, the offer being configured for presentment in a graphical user interface comprising information associated with an online banking account.

In one embodiment, the processor is further configured to present the offer in the graphical user interface. In another embodiment, the graphical user interface comprises information identifying the financial account, and wherein the processor is further configured to present the offer in the graphical user interface near the information identifying the financial account. In another embodiment, the offer comprises the information associated with the financial product. In still another embodiment, the offer comprises a comparison of one or more features of the financial product to one or more features of the financial account.

In one embodiment of the apparatus, the offer comprises information associated with a benefit provided the financial product that is not provided by the financial account. In another embodiment, the online banking account is maintained by a bank and the apparatus is maintained by a party other than the bank.

As another example, a computer program product is provided in one embodiment of the present invention. For example, in one embodiment, the computer program product comprising a computer-readable medium having computer-executable program code portions stored therein, wherein the computer-executable program code portions comprises: (1) a first program code portion configured to provide a graphical user interface to the display device of a computerized apparatus, wherein the graphical user interface comprises information associated with a financial account; (2) a second program code portion configured to determine an offer for a financial product based at least partially on a comparison of the financial account to the financial product; and (3) a third program code portion configured to present the offer for the financial product in the graphical user interface.

In one embodiment of the computer program product, the third program code portion is further configured to present the offer proximate to the information associated with the financial account. In another embodiment, the offer comprises information associated with the financial product. In another embodiment, the offer comprises a comparison of one or more features of the financial product to one or more features of the financial account. In still another embodiment of the computer program product, the offer comprises information describing one or more benefits provided by the financial product that are not provided by the financial account.

BRIEF DESCRIPTION OF THE DRAWINGS

Figure 1:
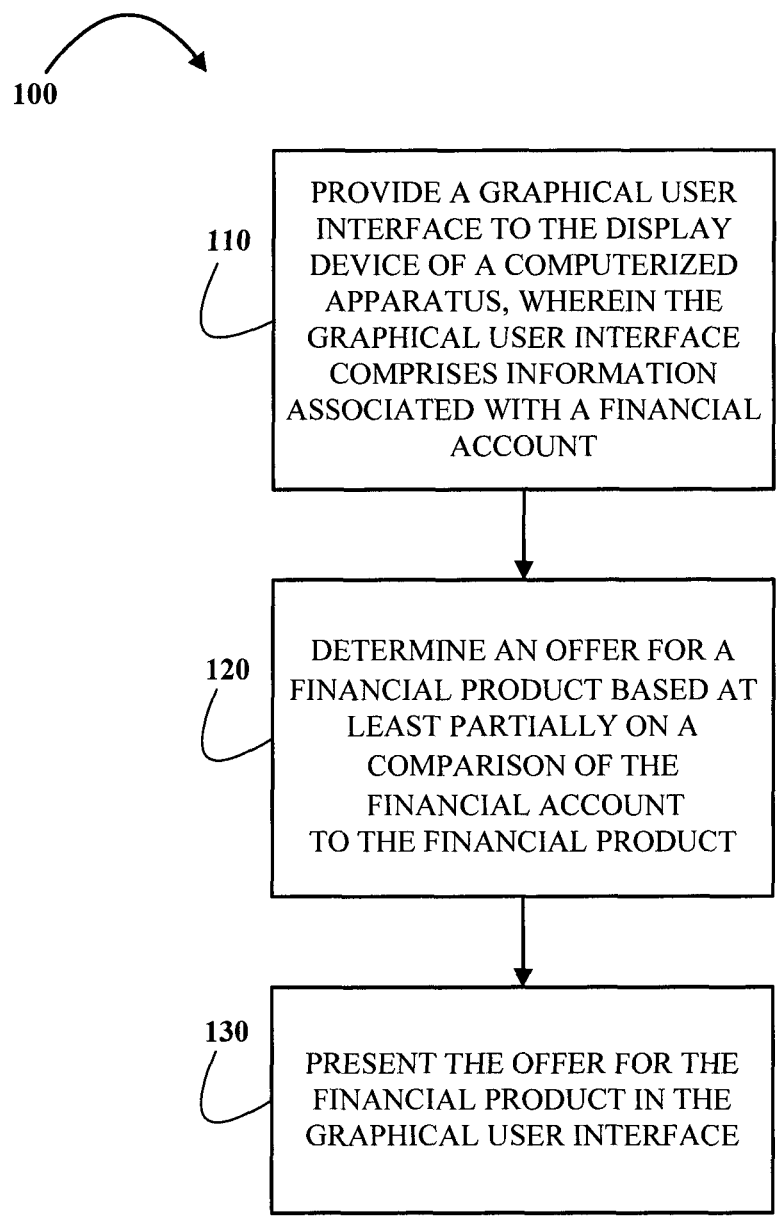
Figure 2:
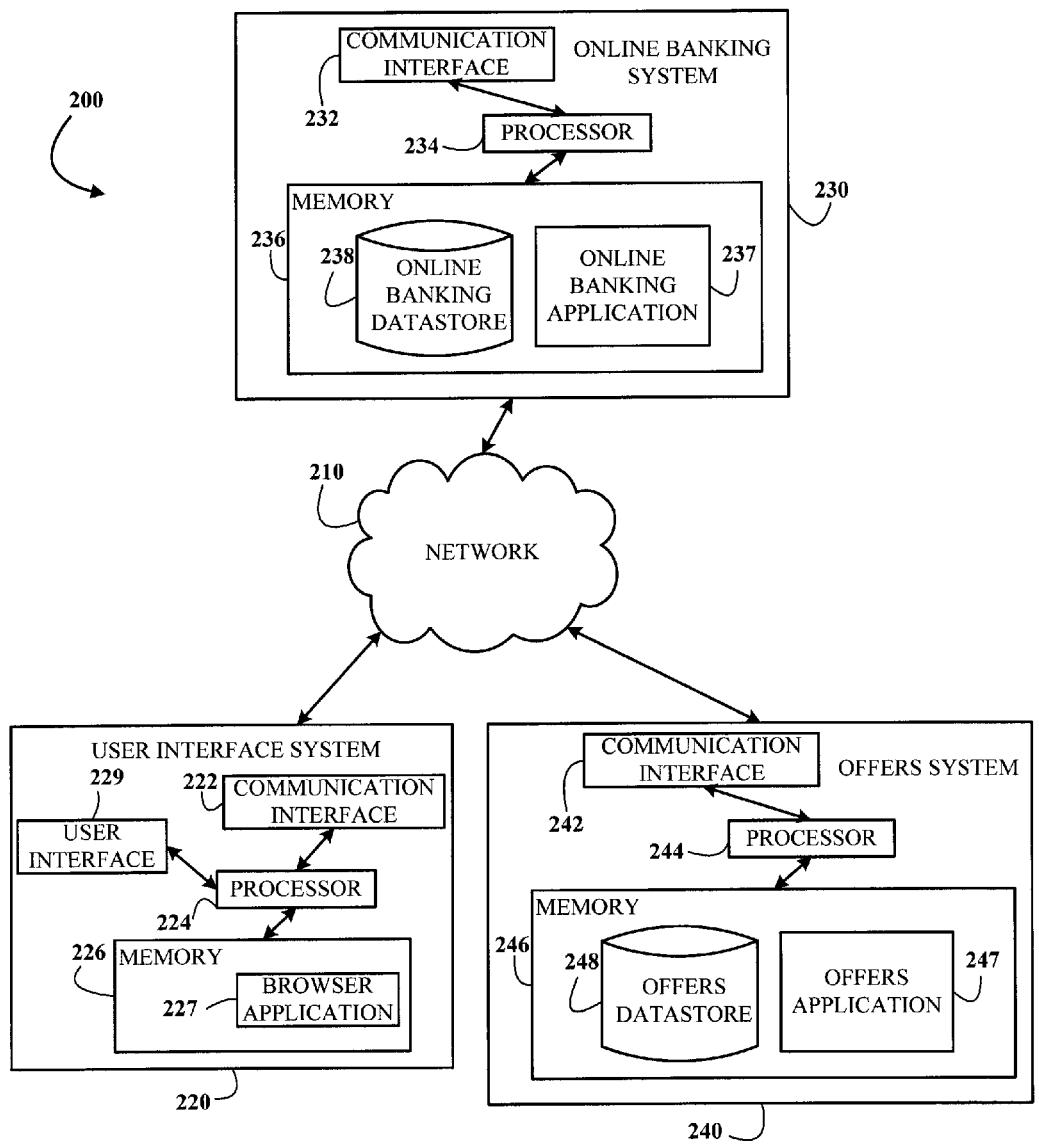
Figure 3:
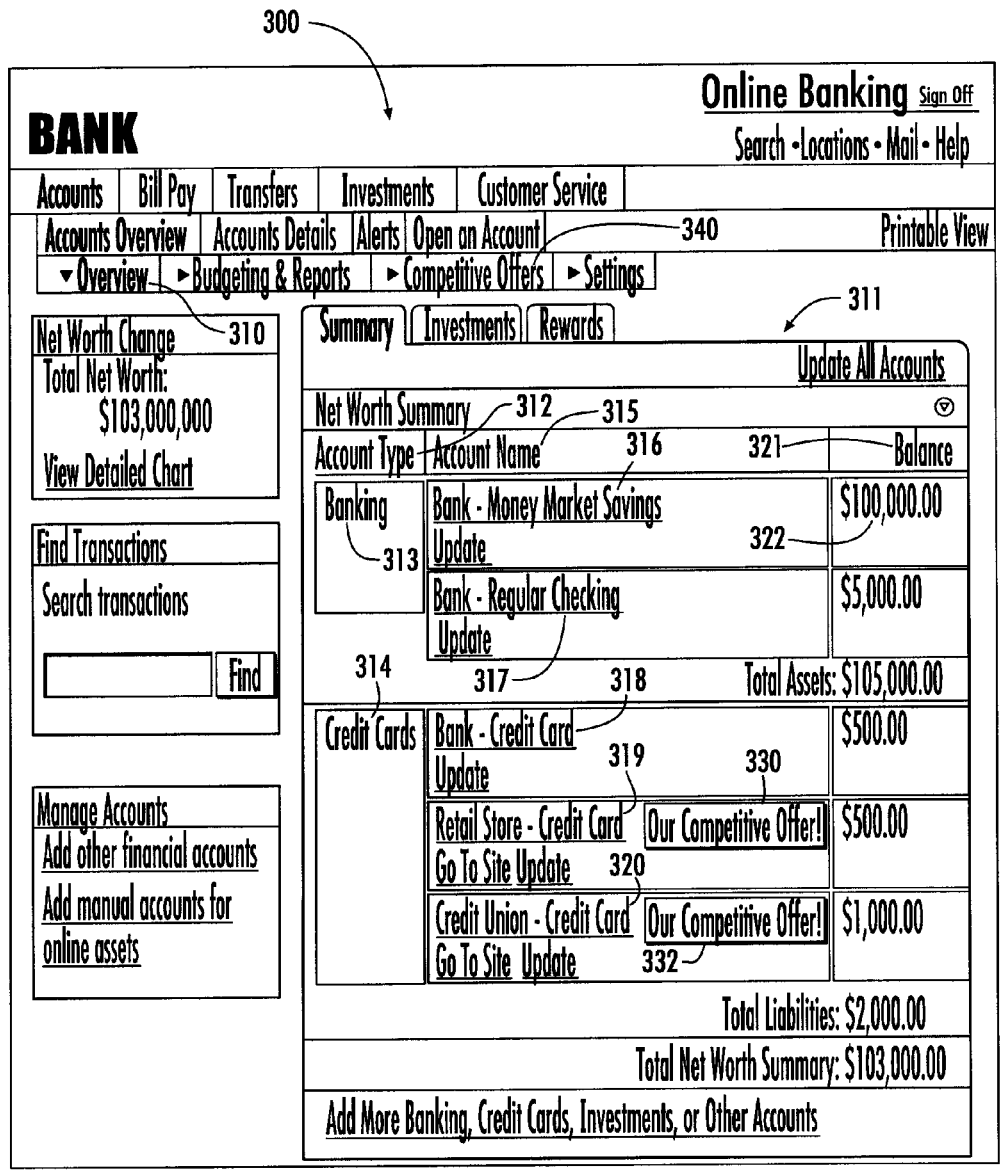

Having thus described embodiments of the invention in general terms, reference will now be made to the accompanying drawings, which are not necessarily drawn to scale, and wherein:

FIG. 1 is a flow diagram illustrating the general process flow of a system for presenting offers for financial products, in accordance with an embodiment of the present invention;

FIG. 2 is a block diagram illustrating technical components of a system for presenting offers for financial products, in accordance with an embodiment of the present invention; and FIG. 3 is a graphical user interface for an online banking system, the graphical user interface being provided by a system for presenting offers for financial products, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa unless explicitly stated otherwise. Also, as used herein, the term "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, or any other apparatus), method (including, for example, a business process, computer-implemented process, or any other process), and/or any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product having a computer-readable storage medium having computer-executable program code embodied in the medium.

Any suitable computer-readable medium may be utilized. The computer-readable medium may be, for example but not limited to, an electronic, magnetic, optical, electromagnetic, infrared, or semiconductor system, apparatus, or device. For example, in one embodiment, the computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or other tangible optical or magnetic storage device.

Computer-executable program code for carrying out operations of the present invention may be written in object oriented, scripted and/or unscripted programming languages such as Java, Perl, Smalltalk, C++, SAS, SQL, or the like. However, the computer-executable program code portions for carrying out operations of the invention may also be written in conventional procedural programming languages, such as the "C" programming language or similar programming languages.

Embodiments of the present invention are described below with reference to flowchart illustrations and/or block diagrams of systems, methods, and computer program products according to embodiments of the invention. It will be understood that each block having the flowchart illustrations and/or block diagrams, and combinations of blocks in the flowchart illustrations and/or block diagrams, may be implemented by computer-executable program code. The computer-executable program code may be provided to a processor of a general purpose computer, special purpose computer, or other programmable data processing apparatus to produce a particular machine, such that the computer-executable program code portions, which execute via the processor of the computer or other programmable data processing apparatus, create mechanisms for implementing the functions/acts specified in the flowchart and/or block diagram block(s).

The computer-executable program code may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the computer-executable program code which executes on the computer or other programmable apparatus provides steps for implementing the functions/acts specified in the flowchart and/or block diagram block(s). Alternatively, computer-implemented steps or acts may be combined with operator or human implemented steps or acts in order to carry out an embodiment of the invention.

Although many of the embodiments of the present invention described herein are generally described as involving "a bank" or "the bank," one of ordinary skill in the art will appreciate that other embodiments of the invention may involve other financial institutions or businesses that take the place of, or work in conjunction with, the bank to perform one or more of the processes or events described herein as being performed by the bank. It will also be understood that the phrase "financial product," as used herein, refers to any good and/or service capable of being sold, offered for sale, distributed, traded, and/or otherwise dealt by a bank, financial institution, and/or other business. For example, a financial product may include any financial account, home mortgage, home equity loan, 529 college savings plan, student loan, automobile loan, wealth management service, online banking service, traveler's checks, foreign currency service, insurance, merchant discount or coupon, and/or the like and/or any combination of the foregoing.

The phrase "financial account," as used herein, may include, for example, a checking account, debit card account, credit card account, gift card account, savings account, money market account, certificate of deposit account, investment account, loan account, line of credit account, and/or any other financial account typically offered by banks and/or other financial institutions. For simplicity, financial accounts are often referred to herein as being "maintained" by a bank, financial institution, or other business, but it will be understood that "maintained" may also mean held, controlled, operated, managed, stored, maintained, and/or the like and/or any combination of the foregoing. Also for simplicity, as many of the embodiments are described herein as involving one bank or "the bank," it will be understood that financial accounts maintained by the bank are referred to herein as "bank financial accounts," whereas financial accounts maintained by other banks or other financial institutions are referred to herein as "non-bank financial accounts." Likewise, it will be understood that "bank financial products" are those financial products offered by the bank, whereas "non-bank financial products" are those financial products offered by another bank or another financial institution.

In general terms, embodiments of the present invention relate to apparatuses and methods for presenting offers for financial products, and more particularly, for presenting offers for financial products in graphical user interfaces. For example, it is well-known that some banks provide graphical user interfaces that bank customers may use to view and/or access information associated with their online banking accounts. In some cases, these online banking accounts comprise information associated with one or more of the customer's bank financial accounts as well as one or more of the customer's non-bank financial accounts. (One example of this is the My Portfolio® tool provided by Bank of America®.) Thus, in these cases, the graphical user interface comprises information associated with the customer's bank and non-bank financial accounts. In such cases, embodiments of the present invention are configured to present the bank customer with one or more offers for bank financial accounts that compare favorably, competitively, or otherwise to the customer's existing bank and/or non-bank financial accounts that are displayed in the graphical user interface. In some embodiments, the one or more offers are meant to persuade the bank customer to switch from using one or more non-bank financial accounts to using one or more similar bank financial accounts.

To meet these and other objectives, according to one embodiment of the present invention, the one or more offers for bank financial accounts are presented directly in the graphical user interface where the customer's existing bank and/or non-bank financial accounts are also displayed. In another embodiment, the offers are presented in the graphical user interface above, below, alongside, near, or otherwise proximate to the information associated with the bank and/or non-bank financial accounts to which the offers correspond. In still another embodiment, the offers comprise information associated with the offered bank financial accounts that may, for example, favorably compare the offered bank financial accounts to the existing bank and/or non-bank financial accounts. Thus, it will be understood that embodiments of the present invention provide highly contextual and specifically targeted offers for bank financial accounts that are calculated to result in higher acceptance rates and therefore higher conversion and/or retention rates.

Of course, it will also be understood that other embodiments of the present invention may vary from the examples described above without departing from the scope and spirit of the present invention. For example, some embodiments may be used by institutions other than banks, including, for example, other financial institutions, businesses, organizations, entities, persons, and/or the like. As another example, other embodiments of the present invention may be used in connection with graphical user interfaces that are not configured to display non-bank financial accounts. In such cases, some embodiments are configured to display one or more offers for other and/or additional bank financial accounts in the graphical user interface. For example, an embodiment may be configured to present an offer in a graphical user interface for a bank savings account based at least partially on the fact that information associated with a bank checking account is already displayed in the graphical user interface.

In another embodiment, the offers may be for bank financial products other than, and/or in addition to, bank financial accounts. For example, an embodiment of the present invention may be configured to present an offer in a graphical user interface to enroll in a wealth management service provided by the bank based at least partially on the fact that the graphical user interface already comprises information associated with a bank money market savings account. In other embodiments, financial products from institutions other than the bank may be offered instead of, and/or in addition to, bank financial products. For example, one embodiment of the present invention may be configured to present in a graphical user interface a coupon usable at a retail store based at least partially on the fact that the graphical user interface comprises information associated with a credit card account maintained by the retail store. In some embodiments, the bank may have a partnership with merchants and other financial institutions, whereby the bank agrees to place offers for their non-bank financial products in the online banking accounts in return for a payment.

It will be understood that, in some embodiments, the offers presented in a graphical user interface may also be accepted via the graphical user interface. For example, in one embodiment, an offer for a bank checking account is presented in the form of a path (e.g., a selectable link) in a graphical user interface, so that an online banking customer may follow the path to automatically enroll in and/or open the bank checking account. However, in other embodiments, the offer may not be configured to be accepted via the graphical user interface. For example, in one embodiment, the offer merely directs the customer to a particular website or phone number that the customer must use to open the account.

It will also be understood that some embodiments may be configured to present offers for financial products to online banking customers, even though those customers do not qualify for and/or are otherwise unable to accept the offer. For example, an embodiment of the present invention may be configured to present an online banking customer with an offer for a home mortgage having a low interest rate, even though the customer cannot actually qualify for the home mortgage because the customer's credit score does not satisfy the bank's underwriting requirements.

Referring now to FIG. 1, an exemplary flow diagram illustrating a general process flow 100 of a system for presenting offers for financial products is provided, in accordance with an embodiment of the present invention. As represented by the block 110, the system provides a graphical user interface to the display device of a computerized apparatus. In some embodiments, the graphical user interface comprises a graphical user interface for an online banking system, but in other embodiments, the graphical user interface is for some other kind of system. In some embodiments, the graphical user interface comprises an Internet web page, an intranet web page, an online banking computer software application, and/or some other graphical user interface operatively connected to a system having the process flow 100. The computerized apparatus may comprise a personal computer system, a mobile phone, a public kiosk, an automated teller machine (ATM), and/or some other device configured to display a graphical user interface. So, for example, one embodiment of a system having the process flow 100 is configured to communicate an Internet web page to a personal computer system comprising software and hardware configured to display the web page.

As described in FIG. 1, the graphical user interface also comprises information associated with a financial account, such as, for example, the account type, account name, account balance, information about transactions made using the account, and/or any benefits, features, rates, payments, terms, conditions, etc. associated with the account. In some embodiments, where the graphical user interface is for an online banking system, the graphical user interface provides an online banking customer with access to an online banking account where the customer may view and/or access one or more financial accounts associated with the online banking account. For example, in one embodiment, the online banking customer may use the graphical user interface to view transactions, request credit limit increases, transfer funds, pay bills, and/or perform other functions typically associated with an online banking account. In one embodiment, the graphical user interface comprises a link, button, or some other path that an online banking customer may select in order to navigate to another web page, pop-up window, tab, and/or the like for performing any of the tasks mentioned above and/or typically associated with an online banking account.

As represented by the block 120, the system having the process flow 100 also determines an offer for a financial product based at least partially on a comparison of the financial account to the financial product. For example, in some embodiments, the comparison involves comparing information associated with the financial account that is at least partially similar to information associated with the financial product. By the phrase "at least partially similar", it is meant that the financial product and financial account may be the same type of account (e.g., both are checking accounts), may have similar features (e.g., both charge an annual payment, may have similar financial benefits (e.g., both save the customer an average of $100 a year), and/or may be at least partially similar in some other way.

In some embodiments, the comparison may involve the information associated with the financial account that is displayed in the graphical user interface. For example, in one embodiment, a system having the process flow 100 is configured to determine an offer for a bank savings account merely because the name of a non-bank savings account is displayed in the graphical user interface.

However, in other embodiments, the comparison may involve any information associated with the financial account that does not appear in the graphical user interface. For example, in one embodiment, a graphical user interface comprises only the names and balance amounts of the customer's bank checking account and customer's non-bank savings account. In this example, the system having the process flow 100 may determine from some source other than the graphical user interface that the non-bank savings account requires an annual payment, a monthly minimum account balance, and has a relatively low interest rate, whereas the savings account offered by the bank requires no annual payment, no minimum account balance, and has a relatively high interest rate. Accordingly, based at least partially on this comparison of information ascertained outside of the graphical user interface, the system having the flow 100 may determine that the bank savings account would be attractive to the bank customer and, therefore, that it should be offered to the customer.

In another embodiment, the system may be configured to determine an offer for a financial product only if it compares favorably to a financial account that is referenced in the graphical user interface. For example, in one embodiment, a system having the process flow 100 may determine an offer for a bank credit card account only if the annual payment for the bank credit card account is lower than the annual payment for the non-bank credit card account displayed in the graphical user interface. In still another embodiment, a system having the process flow 100 may communicate with a datastore comprising information about one or more financial products offered by a merchant, and the system may be configured to determine an offer for one or more of those financial products based at least partially on a comparison of the information associated with the one or more financial accounts in the graphical user interface to the information in the datastore.

Once an offer for a financial product is determined, a system having the flow 100 is configured to present the offer for the financial product in the graphical user interface, as represented by the block 130. It will be understood that the offer may be presented in a number of different forms. For example, in one embodiment, the offer is presented as a path, such as a flashing link, that invites the bank customer to follow the path to view and/or accept the offer. In another embodiment, the offer is presented as an advertisement for the financial product that directs the customer to a website to view more information about the financial product. In yet another embodiment, for example, the offer and information about the financial product are presented in the form of a pop-up (e.g., pop-up window, pop-up box, pop-up ad, etc.) that displays after a non-bank financial account is accessed via the graphical user interface. Other exemplary forms in which the offer may be presented in a graphical user interface include boxes, tabs, columns, windows, pages, buttons, links, fields, quotation bubbles, pop-ups, pop-unders, and/or the like.

It will also be understood that the offer may be presented in a number of different locations in the graphical user interface. For example, in one embodiment, the offer is presented above, below, adjacent, near, or otherwise proximate to the information associated with the non-bank financial account to which the offer corresponds. In another embodiment, the offer is presented in a centralized location within a graphical user interface, such as, for example, a "competitive offers" tab, box, window, and/or the like. In yet another embodiment, the offer may be incorporated with a portion of information already displayed in the graphical user interface. For example, in one embodiment, the name of a non-bank financial account is displayed in a graphical user interface, and the name comprises a link that is displayed in a different color, font, and/or some other way to notify the user that an offer for a bank product that corresponds to that non-bank financial account is being presented. In such a case, the user may select the non-bank financial account name to view more details about the offer in a separate window, for example, and/or accept the offer and open the account.

It will be further understood that the offer may comprise any amount of information and display that information in a variety of different ways. In one embodiment, the offer may describe and/or quantify one or more financial and/or other benefits from switching from a non-bank financial account to a bank financial account. For example, in one embodiment, the offer describes how much money can be saved by switching from a non-bank financial account to a bank financial account. In another embodiment, the offer may comprise a comparison of information associated with the bank financial account to information associated with the non-bank financial account. For example, the offer may draw attention to a relatively high annual percentage rate (APR) of a non-bank credit card account that is listed in the graphical user interface by presenting an offer for a bank credit card account that displays the APR of the bank credit card account directly next to the APR of the non-bank credit card account.

In yet another embodiment, the offer is a selectable path that comprises very little information about the offer, such as a button with the text "Our Competitive Offer!". In such a case, the offer may be selected to display additional information about the offer within the graphical user interface. In another embodiment, the offer comprises a drop-down menu that may comprise a variety of different options therein, including, for example, a "Learn More" option, an "Ask Me Later" option, and/or a "No Thanks" option. The offer may also comprise a drop-down window that displays additional details about the offer if, for example, a cursor is dragged over the offer.

Additionally, it will be understood that the order of the events described in blocks 110, 120, and 130 in FIG. 1 is exemplary and may vary. For example, a system having the process flow 100 may provide a graphical user interface to the display device of a computerized apparatus before, after, or substantially simultaneous with determining an offer for a financial product based at least partially on a comparison of the information associated with the financial account to information associated with the financial product. As another example, a system having the process flow 100 may provide a graphical user interface to the display device of a computerized apparatus before, after, or substantially simultaneous with presenting the offer for the financial product in the graphical user interface.

Referring now to FIG. 2, a system 200 for presenting offers for financial products is provided, in accordance with one embodiment of the present invention. The system 200 includes a network 210, a user interface system 220, an online banking system 230, and an offers system 240. Each of the portions of the system 200 is operatively connected to the network 210, which may include one or more separate networks. Additionally, the network 210 may include a local area network (LAN), a wide area network (WAN), and/or a Global Area network (GAN), such as the Internet. It should be understood that the network 210 may be secure and/or unsecure and may also include wireless and/or wireline technology.

In one embodiment, the user interface system 220 is configured to allow a user (e.g., an online banking customer) to communicate with other networks and/or portions of the system 200, such as the online banking system 230 and/or the offers system 240, and/or vice versa. For example, in one embodiment, the user interface system 220 is a computerized apparatus, such as a personal computer system, ATM, or mobile phone, configured to receive and use a graphical user interface to access a bank customer's online banking account, including viewing and/or accessing information associated with any bank and/or non-bank financial accounts contained therein. The user interface system 220 may also be configured to use a graphical user interface to view and/or accept one or more offers for a financial product presented in the graphical user interface. In another embodiment, the user interface system 220 may be used to reject one or more of the offers via the graphical user interface.

In addition to the examples listed above, it will be understood that the user interface system 220 may include, for example, a portion of a computer network, a personal computer system, an ATM, an Internet web browser, a mobile phone, a personal digital assistant, a public kiosk, a fax machine, and/or some other type of computerized apparatus. In one embodiment, as illustrated, the user interface system 220 includes a communication interface 222, a processor 224, a memory 226 having a browser application 227, and a user interface 229. The communication interface 222 is operatively connected to the processor 224, which is operatively connected to the user interface 229 and the memory 226 having the browser application 227.

Each communication interface described herein, including the communication interface 222, includes hardware, and, in some instances, software, that enables a portion of the system 200, such as the user interface system 220, to transport, send, receive, and/or otherwise communicate information to and/or from the communication interface of one or more other portions of the system 200. For example, the communication interface 222 of the user interface system 220 may include a modem, server, and/or other electronic device that operatively couples the user interface system 220 to another electronic device, such as the electronic devices that make up the online banking system 230.

Each processor described herein, including the processor 224, includes circuitry required for implementing the audio, visual, and/or logic functions of that portion of the system 200 including the processor. For example, the processor 224 of the user interface system 220 may include a digital signal processor device, a microprocessor device, and various analog-to-digital converters, digital-to-analog converters, and other support circuits. Control and signal processing functions of the user interface system 220 may be allocated between these devices according to their respective capabilities. The processor 224 may include functionality to operate one or more software programs based on computer-executable program code portions thereof, which may be stored, for example, in the browser application 227 of the memory 226 of the user interface system 220.

Each memory device described herein, including the memory 226 for storing the browser application 227 and other data, may include any computer-readable medium. For example, the memory 226 of the user interface system 220 may include volatile memory, such as volatile random access memory (RAM) including a cache area for the temporary storage of data. The memory 226 may also include other non-volatile memory, which can be embedded and/or may be removable. The non-volatile memory can additionally or alternatively include an EEPROM, flash memory, or the like. The memory 226 can store any one or more of pieces of information and data used by the user interface system 220 to implement the functions of the user interface system 220.

The browser application 227 may be any computer-executable program code portions configured to allow the user interface system 220 to communicate with other devices over a network using, for example, one or more network and/or system communication protocols. For example, in one embodiment, the browser application 227 includes an Internet Web browser used by the user interface system 220 for communicating with the various portions of the system 200.

The user interface 229 generally includes one or more user output devices, such as a display and/or speaker, for presenting information to a user. The user interface 229 further includes one or more user input devices, such as one or more keys or dials, a touch pad, touch screen, mouse, microphone, camera, scanner, and/or the like, for receiving information from the user.

Also illustrated in FIG. 2 is an online banking system 230, in accordance with one embodiment of the present invention. The online banking system 230 may include, for example, a portion of a computer network, an engine, a platform, a network server, a database system, a front end system, a back end system, a personal computer system, and/or some other type of computing device. In one embodiment, as illustrated, the online banking system 230 includes a communication interface 232, a processor 234, and a memory 236 having an online banking application 237 and an online banking datastore 238. The communication interface 232 is operatively connected to the processor 234, which is operatively connected to the memory 236 having the online banking application 237 and the online banking datastore 238.

In one embodiment, the online banking application 237 includes computer-executable program code portions for instructing the processor 234 to provide a graphical user interface for accessing an online banking account to the user interface 220.

In another embodiment, the online banking application 237 includes computer-executable program code portions for instructing the processor 234 to update information stored in the online banking datastore 238 based on, for example, information provided by the bank customer to the online banking system 230 via the user interface system 220. In yet another embodiment, the online banking application 237 includes computer-executable program code portions for instructing the processor 234 to compare one or more of the financial accounts associated with an online banking account stored in the online banking datastore 238 to one or more of the financial products stored in the offers datastore 248 of the offers system 240.

In one embodiment, the online banking datastore 238 is configured to store information associated with one or more online banking accounts. For example, in one embodiment, the online banking datastore 238 comprises user names, passwords, account names, account numbers, balance amounts, transaction information, and/or other information typically displayed in a graphical user interface for an online banking system. In another embodiment, the online banking datastore 238 comprises one or more rules directed to how financial accounts, advertisements, offers, and/or other information are displayed the graphical user interfaces. In addition, it will be understood that, in at least one embodiment, the online banking datastore 238 provides a substantially real-time representation of the information stored therein, so that when the processor 234 accesses the online banking datastore 238, the information stored therein is current or substantially current.

Also illustrated in FIG. 2 is an offers system 240, in accordance with one embodiment of the present invention. The offers system 240 may include, for example, a portion of a computer network, an engine, a platform, a network server, a database system, a front end system, a back end system, a personal computer system, and/or some other type of computing device. In one embodiment, as illustrated, the offers system 240 includes a communication interface 242, a processor 244, and a memory 246 having an offers application 247 and an offers datastore 248. The communication interface 242 is operatively connected to the processor 244, which is operatively connected to the memory 246 having the offers application 247 and the offers datastore 248.

In one embodiment, the offers application 247 includes computer-executable program code portions for instructing the processor 244 to present an offer for a financial product in the graphical user interface communicated to the user interface system 220. In another embodiment, the offers application 247 includes computer-executable program code portions for instructing the processor 244 to update the offers datastore 248 based on, for example, information provided by the bank customer to the offers system 240 via the user interface system 220. In yet another embodiment, the offers application 247 includes computer-executable program code portions for instructing the processor 244 to compare one or more of the financial accounts associated with an online banking account stored in the online banking datastore 238 to one or more of the financial products stored in the offers datastore 248.

In one embodiment, the offers datastore 248 is configured to store information associated with one or more financial products and/or one or more offers for those one or more financial products. For example, in one embodiment, the offers datastore 248 comprises information about every credit card offered by the bank, including, for example, names, payments, balance transfer requirements, annual percentage rates, cash back and other rewards, and/or the like. In another embodiment, the offers datastore 248 comprises information about product offers, such as, for example, one or more rules on how/what/when/where offers are to be presented to online banking customers via graphical user interfaces. In another embodiment, the offers datastore 248 comprises information about special, limited, and/or temporary offers, such as, for example, special introductory interest rates on credit cards. In addition, it will be understood that, in at least one embodiment, the offers datastore 248 provides a substantially real-time representation of the information stored therein, so that when the processor 244 accesses the offers datastore 248, the information stored therein is current or substantially current.

It will be understood that the system 200 may implement any embodiment of the general process flow 100 described herein. For example, according to one embodiment, the online banking system 230 may provide a graphical user interface to the user interface system 220, wherein the graphical user interface comprises information associated with a financial account, as represented by the block 110. As represented by the block 120, the offers system 240 may also determine an offer for a financial product based at least partially on a comparison of the financial account to the financial product. Additionally, as represented by the block 130, the online banking system 230 and/or the offers system 240 may also present the offer for the financial product in the graphical user interface.

It should be understood that some or all of the portions of the system 200 may be combined into a single portion. For example, in one embodiment, the user interface system 220 and the online banking system 230 are combined into a single user interface and online banking system configured to perform all of the same functions of those separate portions as described herein. As another example, in another embodiment, the online banking system 230 and the offers system 240 may be combined into a single online banking and offers system configured to perform all of the same functions of those separate portions as described herein. Likewise, some or all of the portions of the system 200 may be separated into two or more distinct portions. For example, in one embodiment, the online banking system 230 may be separated into an online banking storage system and an online banking service system.

In addition, the various portions of the system 200 may be maintained by the same or separate parties. For example, in one embodiment, an online banking customer maintains the user interface system 220, a bank maintains the online banking system 230, and a third party vendor maintains the offers system 240. In another embodiment, a bank maintains each and every portion of the system 200, including any embodiments of the network 210, user interface system 220, online banking system 230, and offers system 240, as described herein.

Referring now to FIG. 3, an exemplary graphical user interface 300 is provided, in accordance with a specific embodiment of the present invention. The graphical user interface 300 may comprise an Internet web page, an intranet web page, or some other kind of graphical user interface. As shown, the graphical user interface 300 comprises information associated with an online banking account. It will be understood that the graphical user interface 300 is provided for the benefit of a bank customer. To that end, the graphical user interface 300 comprises information associated with a customer's bank financial accounts in addition to the customer's non-bank financial accounts. For example, as displayed in the graphical user interface 300, the bank customer has a retail store credit card account 319 that is maintained by a retail store and a credit union credit card account 320 that is maintained by a credit union. It will be understood that the graphical user interface 300 allows the bank customer to view and/or access any information and/or perform any function typically associated with an online banking account. At the same time, it will also be understood that while the graphical user interface 300 comprises information associated with a specific online banking account having specific financial accounts, balance amounts, pages, tabs, etc., other embodiments of the present invention may be different.

As shown in FIG. 3, the graphical user interface 300 comprises an accounts overview page 310 that comprises a net worth summary tab 311. The net worth summary tab 311 further comprises an account type list 312, an account name list 315, and a balance list 321. The account type list 312 comprises a banking category 313 and a credit card category 314 for categorizing the customer's financial accounts. The account name list 315 comprises the names of the customer's financial accounts and displays them according to the categories in the account type list 312. For example, in the banking category 313, the account name list 315 comprises a bank money market savings account 316 and a bank regular checking account 317. In the credit card category 314, the account name list 315 comprises a bank credit card account 318, a retail store credit card account 319, and a credit union credit card account 320. Each of the bank customer's financial accounts also corresponds with a particular balance amount in the balance list 321. For example, as illustrated, the bank customer has a $100,000.00 amount 322 in the bank money market savings account 316.

As also illustrated in FIG. 3, the accounts summary tab 311 further comprises offers 330 and 332 positioned proximate to the two non-bank financial accounts listed in the online banking account. Either or both of the offers 330 and 332 may be paths, such as buttons or links, thumbnails, advertisements, and/or any other graphical user interface features. As illustrated, the offers 330 and 332 represent the presentment of offers to the bank customer for bank financial products that correspond to the non-bank financial accounts listed in the graphical user interface 300. Specifically, the offer 330 represents an offer for a bank credit card account at least partially similar to the retail store credit card account 319, and the offer 332 represents an offer for a bank credit card account at least partially similar to the credit union credit card account 320. In another embodiment, a plurality of offers may correspond to the same financial account listed in the customer's online banking account. For example, in one embodiment, a system providing the graphical user interface 300 may be configured to determine and present more than one offer for any given non-bank financial account listed in the customer's online banking account. In yet another embodiment, a plurality of offers listed in the graphical user interface 300 may represent the same offer for a bank financial product. For example, in one embodiment, the offers 330 and 332 may represent an offer for the same bank credit card account.

In one embodiment, either or both of the offers 330 and 332 may be selected to display information about the offers. More specifically, in one embodiment, the offer 330 comprises a button that may be selected to, for example, display a pop-window or navigate to another page where information associated with the customer's existing retail credit card account is compared alongside information associated with the offered bank credit card account. In one embodiment, the bank customer may select the offer 330 to navigate to the competitive offers page 340 where information associated with one or more bank financial products is listed. In other embodiments, information about the offers may be presented in other ways. For example, in one embodiment, merely dragging a cursor over the offer 330 may display information associated with the offered credit card account alongside the offer 330 or in a different window. In still another embodiment, the offers 330 and/or 332 may not be selectable at all. For example, the offers 330 and 332 may merely be advertisements for bank credit card accounts that may comprise information about the accounts and/or about how to enroll in and/or open them.

In another embodiment, either or both of the offers 330 and 332 may be used to accept the offer they represent. For example, according to one embodiment, the offer 332 may be selected, such as, for example, where the offer 332 is a link, to automatically open the bank credit card account. In another embodiment, selecting the offer 332 may also automatically close and/or send notice to close the retail store credit card account 319 maintained by the retail store. In another embodiment, these enrollment and/or closing events do not happen automatically by selecting the offer 332. For example, in one embodiment, selecting the offer 332 navigates the user to the competitive offers page 340 where the customer may enter any information required to open the bank credit card account. In another embodiment, the customer may select offer 332 to display an enrollment application for the bank credit card account that the customer may, for example, at least partially fill out and/or submit via the graphical user interface 300 and/or print out to complete later.

In one embodiment, all of these and/or other events may occur and/or be performed during the same online banking session. For example, according to one embodiment, an online banking customer may use a graphical user interface to log in to his or her online banking account, view an offer in the online banking account for a bank credit card account at least partially similar to the bank customer's existing credit union credit card account listed in the online banking account, begin and complete an enrollment application for the bank credit card account, close the credit union credit card account, and then use the graphical user interface to log out of his or her online banking account.

Although not shown in FIG. 3, the graphical user interface 300 may also comprise one or more features relating to a time, location, and/or method by which a offer is presented. For example, according to one embodiment, an online banking customer may select an option to permit the presentment of offers for financial products only twice a week or only on Friday mornings. As another example, the customer may select an option to present offers in a certain size, font, color, etc. As another example, the customer may select an option that requires presentment of an offer next to or otherwise proximate to the financial account to which the offer corresponds. In another embodiment, the graphical user interface 300 may comprise an option for selectively turning on and/or turning off the presentment of offers altogether. In still another embodiment, the graphical user interface 300 may also comprise a feature, such as a selectable link having the text "Don't show me again," that allows the user to dismiss and/or reject an offer. As another example, the offers may comprise a check box or some other feature for deleting the offers from the graphical user interface 300 if the customer is not interested in pursuing them.

It will be understood that the graphical user interface 300 may be configured for use with any of the apparatuses and/or methods described herein. For example, in one embodiment, the online banking system 230 of the system 200 may be configured to provide the graphical user interface 300 to the user interface system 220. As another example, in one embodiment, a system having the flow 100 may be configured to present the offers 330 and 332 in the graphical user interface 300, as represented by the block 130 in FIG. 1.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method comprising:
providing a computer processor executing computer readable instruction code structured to cause the computer processor to:
provide an online banking graphical user interface to a computer accessible to a user wherein the online banking graphical user interface comprises financial account information relating to one or more features for each of a first and a second financial account that are respectively provided by a first and a second financial institution, wherein the online banking graphical user interface is maintained by the first financial institution, wherein the first financial institution is different than the second financial institution, and wherein the user is the holder of the first and the second financial account respectively provided by the first and the second financial institutions;
receive information regarding one or more financial products associated with the first financial institution;
compare one or more features associated with one or more financial products associated with the first financial institution to one or more features of the second financial account provided by the second financial institution;
determine an offer for, at least, one of the one or more financial products associated with the first financial institution based at least partially on the comparison, wherein the determining the offer is based at least partially on determining a benefit provided by the, at least, one of the one or more financial products that is not provided by the second financial account provided by the second financial institution; and
display the offer, via the online banking graphical user interface, wherein the offer comprises the comparison of the one or more features of the, at least, one of the one or more financial products associated with the first financial institution to the one or more features of the second financial account provided by the second financial institution.

2. The computer-implemented method of claim 1, wherein the displaying the offer comprises displaying the offer proximate to the information associated with the financial account provided by the second financial institution.

3. The computer-implemented method of claim 1, wherein the offer comprises information describing a benefit provided by the financial product that is not provided by the financial account provided by the second financial institution.

4. The computer-implemented method of claim 1, wherein the displaying the offer comprises displaying a selectable path in the graphical user interface that at least partially relates to the offer.

5. The computer-implemented method of claim 1, wherein the displaying the offer comprises displaying a pop-up in the graphical user interface that at least partially relates to the offer.

6. The computer-implemented method of claim 1, wherein the offer is configured to be accepted via the graphical user interface.

7. The computer-implemented method of claim 1, wherein both the financial account provided by the second financial institution and the financial product are at least one of a checking account, debit card account, credit card account, savings account, certificate of deposit account, investment account, loan account, or credit line account.

8. The computer-implemented method of claim 1, wherein the displaying the offer comprises displaying the offer in a centralized location in the graphical user interface.

9. The computer-implemented method of claim 1, wherein the displaying the offer comprises modifying the appearance of the information associated with the financial account provided by the second financial institution in the graphical user interface to indicate that the offer has been presented.

10. An apparatus comprising:
a communication interface; and
a processor operatively connected to the communication interface and configured to:
provide an online banking graphical user interface to a computer accessible to a user wherein the online banking graphical user interface comprises financial account information relating to one or more features for each of a first and a second financial account that are respectively provided by a first and a second financial institution, wherein the online banking graphical user interface is maintained by the first financial institution, wherein the first financial institution is different than the second financial institution, and wherein the user is the holder of the first and the second financial account respectively provided by the first and the second financial institutions;
  receive information regarding one or more financial products associated with the first financial institution;
  compare one or more features associated with one or more financial products associated with the first financial institution to one or more features of the second financial account provided by the second financial institution;
  determine an offer for, at least, one of the one or more financial products associated with the first financial institution based at least partially on the comparison, wherein the determining the offer is based at least partially on determining a benefit provided by the, at least, one of the one or more financial products that is not provided by the second financial account provided by the second financial institution; and
  display the offer, via the online banking graphical user interface, wherein the offer comprises the comparison of the one or more features of the, at least, one of the one or more financial products associated with the first financial institution to the one or more features of the second financial account provided by the second financial institution.

11. The apparatus of claim 10, wherein both the first financial account and the second financial account are at least one of a checking account, debit card account, credit card account, savings account, certificate of deposit account, investment account, loan account, or credit line account.

12. The apparatus of claim 10, wherein the offer comprises information describing a benefit provided by the second financial account that is not provided by the first financial account.

13. The apparatus of claim 10, wherein the offer comprises a selectable path configured to accept the offer for the second financial account.

14. An apparatus comprising:
a communication device configured to receive information associated with an online banking account;
a memory device configured to store information associated with one or more financial products associated with the first financial institution; and
a processor operatively connected to the communication device and the memory device, and configured to:
  provide an online banking graphical user interface to a computer accessible to a user, wherein the online banking graphical user interface comprises financial account information relating to one or more features for each of a first and a second financial account that are respectively provided by a first and a second financial institution, wherein the online banking graphical user interface is maintained by the first financial institution, wherein the first financial institution is different than the second financial institution, and wherein the user is the holder of the first and the second financial account respectively provided by the first and the second financial institutions;
  receive information regarding one or more financial products associated with the first financial institution;
  compare one or more features associated with one or more financial products associated with the first financial institution to one or more features of the second financial account provided by the second financial institution;
  determine an offer for, at least, one of the one or more financial products associated with the first financial institution based at least partially on the comparison, wherein the determining the offer is based at least partially on determining a benefit provided by the, at least, one of the one or more financial products that is not provided by the second financial account provided by the second financial institution; and
  display the offer, via the online banking graphical user interface, wherein the offer comprises the comparison of the one or more features of the, at least, one of the one or more financial products associated with the first financial institution to the one or more features of the second financial account provided by the second financial institution.

15. The apparatus of claim 14, wherein the online banking graphical user interface comprises information identifying the financial account provided by the second financial institution, and wherein the processor is further configured to use the communication device display the offer in the online banking graphical user interface near the information identifying the financial account provided by the second financial institution.

16. The apparatus of claim 14, wherein the offer comprises information associated with the financial product.

17. The apparatus of claim 14, wherein the offer comprises information describing a benefit provided by the financial product that is not provided by the financial account provided by the second financial institution.

18. A computer program product comprising non-transitory a computer-readable medium having computer-executable program code portions stored therein for causing a computer to:

provide an online banking graphical user interface to a computer accessible to a user wherein the online banking graphical user interface comprises financial account information relating to one or more features for each of a first and a second financial account that are respectively provided by a first and a second financial institution, wherein the online banking graphical user interface is maintained by the first financial institution, wherein the first financial institution is different than the second financial institution, and wherein the user is the holder of the first and the second financial account respectively provided by the first and the second financial institutions;

receive information regarding one or more financial products associated with the first financial institution;

compare one or more features associated with one or more financial products associated with the first financial institution to one or more features of the second financial account provided by the second financial institution;

determine an offer for, at least, one of the one or more financial products associated with the first financial institution based at least partially on the comparison, wherein the determining the offer is based at least partially on determining a benefit provided by the, at least, one of the one or more financial products that is not provided by the second financial account provided by the second financial institution; and display the offer, via the online banking graphical user interface, wherein the offer comprises the comparison of the one or more features of the, at least, one of the one or more financial products associated with the first financial institution to the one or more features of the second financial account provided by the second financial institution.

19. The computer program product of claim 18, wherein the offer is displayed proximate to the information associated with the financial account provided by the second financial institution.

20. The computer program product of claim 18, wherein the offer comprises information associated with the financial product.

21. The computer program product of claim 18, wherein the offer comprises information describing one or more benefits provided by the financial product that are not provided by the financial account provided by the second financial institution.

22. The apparatus of claim 10, wherein the processor is further configured to:

compare information associated with the second financial account to information associated with the first financial account; and determine the offer based at least partially on the processor comparing the information associated with the second financial account to the information associated with the first financial account.

23. The apparatus of claim 14, wherein the online banking graphical user interface comprises transaction information from one or more transactions involving the financial account provided by the second financial institution.

24. The method of claim 1, wherein the offer is displayed in a plurality of windows via the online banking account such that the plurality of windows and the financial account provided by the second financial institution are simultaneously visible on the graphical interface comprising the online banking account.

25. The method of claim 24, wherein the plurality of windows comprising the offer are separate from and at a position relative to the graphical user interface comprising the online banking account embodying the holder's financial account provided by the second financial institution.

26. The method of claim 1, wherein the comparison comprised in the offer compares the one or more features of the financial product alongside the one or more features of the financial account provided by the second financial institution.

27. A computer-implemented method comprising:

providing a computer processor executing computer readable instruction code structured to cause the computer processor to:

provide an online banking graphical user interface to a computer accessible to a user, wherein the online banking graphical user interface comprises financial account information relating to one or more features for each of a first and a second financial account that are respectively provided by a first and a second financial institution, wherein the online banking graphical user interface is maintained by the first financial institution, wherein the first financial institution is different than the second financial institution, and wherein the user is the holder of the first and the second financial account respectively provided by the first and the second financial institutions;

receive information regarding one or more financial products associated with the first financial institution;

compare one or more features associated with one or more financial products associated with the first financial institution to one or more features of the second financial account provided by the second financial institution;

determine an offer for, at least, one of the one or more financial products associated with the first financial institution based at least partially on the comparison, wherein the determining the offer is based at least partially on determining a benefit provided by the, at least, one of the one or more financial products that is not provided by the second financial account provided by the second financial institution; and display the offer, via the online banking graphical user interface, wherein the offer comprises a side by side comparison of the one or more features of, at least, one of the one or more financial products associated with the first financial institution to the one or more features of the second financial account provided by the second financial institution.

\* \* \* \* \*